(12) United States Patent
Gamerman

(10) Patent No.: US 11,369,543 B2
(45) Date of Patent: Jun. 28, 2022

(54) NON-VISUAL PRECISION SPATIAL AWARENESS DEVICE

(71) Applicant: Noah Eitan Gamerman, Vienna, VA (US)

(72) Inventor: Noah Eitan Gamerman, Vienna, VA (US)

(73) Assignee: Noah E Gamerman, Vienna, VA (US)

( * ) Notice: Subject to any disclaimer, the term of this patent is extended or adjusted under 35 U.S.C. 154(b) by 0 days.

(21) Appl. No.: 15/705,182

(22) Filed: Sep. 14, 2017

(65) Prior Publication Data

US 2018/0078444 A1 Mar. 22, 2018

Related U.S. Application Data

(60) Provisional application No. 62/396,129, filed on Sep. 17, 2016.

(51) Int. Cl.
| | | |
|---|---|---|
| *A61H 3/06* | (2006.01) | |
| *G01C 3/08* | (2006.01) | |
| *G01S 17/93* | (2020.01) | |

(52) U.S. Cl.
CPC ............ *A61H 3/061* (2013.01); *G01C 3/08* (2013.01); *G01S 17/93* (2013.01); *A61H 2003/063* (2013.01)

(58) Field of Classification Search
CPC .......................... A61H 2003/063; A61H 3/061
See application file for complete search history.

(56) References Cited

U.S. PATENT DOCUMENTS

| | | | | |
|---|---|---|---|---|
| 6,198,395 B1* | 3/2001 | Sussman | .................. | A61F 9/08 340/407.1 |
| 8,825,389 B1* | 9/2014 | Campbell | .............. | A61H 3/061 701/433 |
| 2006/0028544 A1* | 2/2006 | Tseng | ..................... | A61H 3/061 348/62 |
| 2007/0066415 A1* | 3/2007 | Hou | ................... | A63B 69/3608 473/219 |
| 2008/0088469 A1* | 4/2008 | Doemens | ............... | A61H 3/061 340/686.6 |
| 2009/0234576 A1* | 9/2009 | Ou | .......................... | G01S 13/42 701/533 |
| 2012/0053826 A1* | 3/2012 | Slamka | ................ | G01C 21/165 701/301 |
| 2014/0180595 A1* | 6/2014 | Brumback | ............. | A63B 24/00 702/19 |

* cited by examiner

*Primary Examiner* — Charlie Y Peng

(57) ABSTRACT

This invention described a Spatial Recognition Device (SRD) based on a mounted high precision measurement sensor that enables the user to detect and navigate around objects and obstacles like traditional white cane would, but without contact, and also allow the user to identify the location and shape of objects to enable identifying such obstacles and objects. The device can also provide route guidance through a GPS and collision avoidance through onboard and/or cloud based or hybrid computational systems, accelerometers and other sensors. The device enables sensing ranges from approximately one inch to a maximum range dependent on the high precision measurement sensor used in the device. This device would not be mounted on a "white cane" or similar assistive device.

9 Claims, 9 Drawing Sheets

FIGURE 6
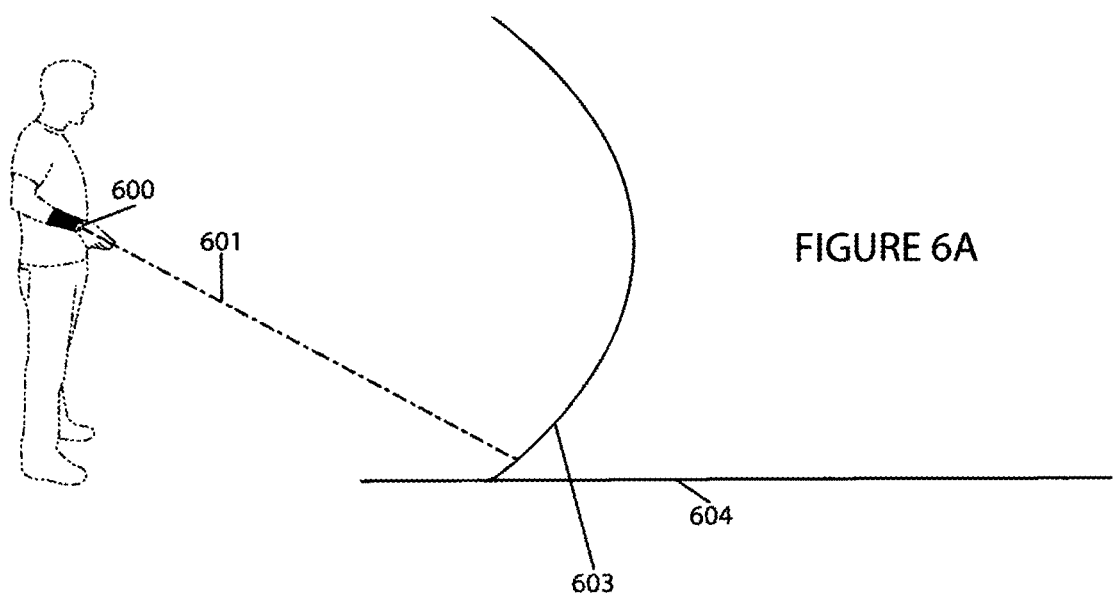
FIGURE 6A
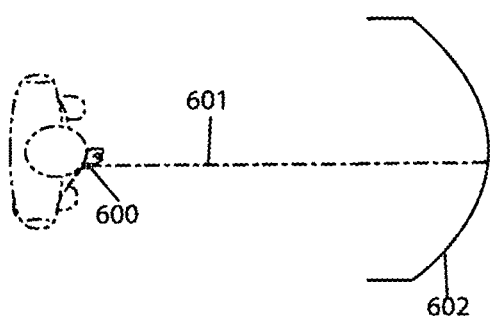
FIGURE 6B

NON-VISUAL PRECISION SPATIAL AWARENESS DEVICE

CROSS-REFERENCE TO RELATED APPLICATIONS

This application claims the benefit of the U.S. Provisional Patent Application No. 62/396,129, fid Sep. 17, 2016, entitled "Non-visual precision spatial awareness device" by the above sole inventor on, (USPTO efile Acknowledgement 26957476), which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention

This invention is directed to a device that enables a user to navigate their environment, acquire spatial awareness, locate and identify objects and obstacles from close to extended distances without vision or contact between the device and the scanned area.

Description of Related Art

Vision is one of the most important senses in enabling individuals to navigate and interact with their environment. Its importance is underscored by the fact that visual processing is one of the largest components of brain activity. Sighted persons take for granted the challenges and dangers faced when vision is obscured or impaired. When vision is impaired, obstacles and dangers abound from avoiding collisions with or tripping on objects at ground to head height, stairs, curbs, uneven ground and holes. Locating and identifying objects, such as a table or objects on a table (cup, keys, book) or surface (shelf, door, door knob) beyond one's reach.

Until now, the devices for a sited person have essentially focused on coarse near range "collision avoidance" during locomotion. That is to say, giving the user the means to generally identify the presence of an object just in front of them so they can navigate it. For example, the traditional "white" cane is a simple device used by the visually impaired to aid in everyday tasks such as navigation and object detection. Its design is simple and has seen little to no innovation since inception almost 100 years ago (or even earlier walking sticks). It provides a sturdy but lightweight pole of varying lengths painted white with a thick orange stripe near the handle. This color scheme is a global sign for blindness so as to signal to others the user's disability. The white cane is held by the user and is then swung in a sweeping motion horizontally back and forth until it strikes an obstacle (an object or void) in the user's path alerting the user, who can then navigate accordingly.

The cane provides very limited spatial awareness as its feedback is based on tactile contact with objects within the range of the cane tip (about one meter). Also, generally it is practical to use only for sweeping ground level objects, rather than those around the head and upper body, finding small objects on a table, or navigating confined, crowded or dynamic spaces that do not provide room for sweeping with the cane.

Over the past 40 years, however, there has started to be some new implementations of more advanced devices the visually impaired can use for object detection. Some work dating back to 1974 was published by Malverin Benjamin in the Bulletin of Prosthetics Research (see also Proc. SPIE 0040, Quantitative Imagery in the Biomedical Sciences II, (1 Mar. 1974)). In his article "The Laser Cane" (pp. 443-450) he speaks of a device that uses three laser beams set to project in different directions, one forward, one upward, and one downward. This system would generate an expanding cone of detection that if breached by an object would signal the user via an acoustic stimulation device in contact with the user's index finger. This system claimed to allow the user to sense any obstacles ahead as well as certain architectural changes such as stairs. However, this system is based on conventional reflectance lasers. These systems are inadequate for this purpose, because there are many conditions in which these lasers will fail to reflect an adequate amount of laser beam to function (e.g., a surface with low reflectance, high absorbance or dispersion, or that divert reflection away from the sensor).

In 1996 a patent by George F. Kelk describes a system comprised of a sensor housed in a device like a flashlight that the user would sweep back and forth to sense distances. The output from this device would be in the form of varying acoustic response that would be interpreted by the user. This system while capable of precisely detecting objects in the distance lacks the ability to accurately convey that information to the user. Because the sensing device is not mounted collinear to the users arm a visually impaired user will not be accurately determine where the device is pointing. In conjunction with this, a device that must be constantly held by user creates an unnecessary burden on the user by removing the use of one of their hands. Also, a visually impaired user may be required to put this device down or may accidently drop it at some point. This creates a dangerous situation in which a visually impaired person lacks their primary sight aid with no means to find it. More recently in 2004, an article by Springer-Verlag, Christophe Jacquet et al titled "A Context-Aware Locomotion Assistance Device for the Blind" in People and Computers XVIII—Design for Life, a collision avoidance device was described that utilizes an infrared proximity sensor that functions through the use of collimated LED beams. These LED beams like the device mentioned by Malverin Benjamin project in different directions. If an obstacle ahead generates enough back scatter above a defined threshold the device vibrates to alert the user. Later a second-generation device entitled "Teletact" that utilizes a tactical or acoustic method of user feedback. The tactile feedback style vibrates two fingers to signal distances up to 6 meters. For distances, up to 15 meters the device uses 28 distinct musical notes so that detected objects have distances relayed back as a collection of notes. Object distance is determined via a projected laser dot that has its size measured to determine distance. This system is easily differentiated from the Spatial Recognition Device (SRD) due to its use of LED beams as opposed to laser Time of Flight (TOF) sensors as well as its method of acoustic feedback through the use of distinct sounds. However, this device had the same unsuitability in many circumstances because this senor method is also confounded by variance in surface reflectivity.

A German device produced by Vistac GmbH is a device built onto a standard white cane and mounts an adjunctive sensor said to provide collision avoidance with overhanging (head/chest level) obstacles. The device utilizes an infrared range measuring system. The beam projects in a forward and upward direction and has a threshold detection range of between 120 and 160 cm. Any obstacle that hits this threshold range is reported to the user as an upper body collision danger by vibrating the cane handle Systems that rely on waiting for an object to break a defined distance threshold are inadequate for allowing the user to determine spatial awareness as they only look for objects in a defined field of interest and only provide feedback when an object enters that field. The use of an infrared sensor of this type also has limited sensitivity for small objects, or that do not effectively reflect the infrared light back to the sensor.

A collision avoidance device described in patent WO 2012040703 A2 by Roger Gassert. This device is mounted on a standard white cane that is said to incorporate a "3D laser sensor". This device describes the use of "3D TOF" sensor to sense objects at a distance in a defined scanning window primarily from the user's torso and up. Sensor data is relayed to the user via a haptic interface consisting of vibro-tactile elements. This device is described as using its sensor to form a fan map of the space ahead with the contour translated to a commensurate feedback across the user's palm via a haptic feedback in the handle. The 3D TOF sensor while bearing a similar name to the laser Time of flight distance sensor used in the SRD is a different type of sensor entirely, it acts as more of a camera to measure the depths of a broad fan shape area whereas a laser TOF distance sensor measures only one precise spot. It is also important to note that this fan shape sensing and haptic feedback provides an awareness that is very coarse due to inherently limited spatial resolution of the haptic feedback and human proprioception. Proving a few points of vibration across the palm for example might inform the user of the presence of an object along a general direction, but with little resolution of size and shape and ability to readily form a mental image. This patent application also loosely described combining the device with accelerometers or GPS so that in theory (but not described method) the device can consider the direction of locomotion so provides collision alert only in the direction of movement.

Most recently a device described in patent US20080309913A1 by James Fallon provides a constant 3D LADAR scanning system. This system incorporates a battery of sensors along with a lidar laser sensor for depth scanning to draw input about the user's movements and their surroundings to help navigate the user to their destination Information is conveyed to the user by a auditory feedback mechanism that delivers depth information in the form of audio intensity, location by audio image, color by audio frequency, and texture or other object information by modulations. This system differs from the SRD in that the system described by Fallon acts as a radar system constantly scanning the area around the user and then delivering this information to the user to then comprehend. The SRD system instead has a user aimed depth sensing system that allows to user to direct the scanning system as they please to guide themselves while also relying on a collection of backup sensors to aid in emergency collision avoidance and route guidance.

Other collision avoidance devices that utilize ultrasonic detection, as opposed to lasers or LED's, sold by Ray from CareTec an Austrian company, and the Ultracane from Sound Foresight Technology Limited, a company based in the UK. These devices can provide haptic and acoustic alerts to the presence of obstacles between 1.5 and 3 meters away. Another more complicated device is described as an attempt to guide the user around that object. A device detailed by Sebastian Ritzler in a German patent application (DE 10 2006 024 340 B4) has an ultrasonic sensor or a camera system built into a standard white cane used to detected objects in the user's path. At the tip of the cane is a wheel that when an object is detected will become powered to steer the user out of the objects path. This device, however, cannot be used as a standard white cane due to the presence of the wheel at the tip preventing the standard sweeping motion of a white cane. Other devices described in literature include similar sensors mounted on hand devices, eyeglasses, and head mounts. These devices are different from the SRD in that they rely on ultrasonic means of object detection as opposed to a laser device. Ultrasonic detectors are also unsuitable for more than short range collision avoidance. This is because with an ultrasound sensor the emitted and reflected acoustic wave are propagated as a cone with low border resolution at the edge of the wave. Thus, the location precision falls quickly with distance and even at short ranges can be ineffective with narrow or poorly hypoechoic objects, from poor environmental conditions such as humidity and temperature, or from interference effects such as acoustic phase effects at close ranges, and background echoing at longer ranges.

Most importantly all of the above devices differ greatly from the SRD because they all still in chief rely on providing a collision avoidance alert system, or provide low resolution object alerting, to support or substitute for a white cane as the primary mobility method. They also use sensor modalities that are highly subject to sensing variance or defeat by common objects and conditions that provide suboptimal reflection or signal interference. This is where the SRD is innovatively different.

The prior art describes using low precision measurement systems alone or enhanced with data from accelerometers, GPS/GIS systems, compasses, computer systems and memory such as the device detailed by Vladimir Kulyukin in patent US 20070018890 A1. However, it is the addition of the SRD and its innovative HPMS that enables determining the user's precise location relative to objects (distance and angle, and other directions) to the degree that allows for safe, accurate and reliable recognition and navigation. With the prior art, the user location (and location of objects and their relative position) are approximated. For example, non-augmented GPS has signal in space "worst case" pseudo range accuracy of 7.8 meters at a 95% confidence level. The actual accuracy users attain depends on factors outside the government's control, including atmospheric effects, sky blockage, and receiver quality. Real-world data from the FAA show that their high-quality GPS SPS receivers (with conventional signal and data augmentation provide 3.5-meter horizontal accuracy. Higher accuracy is not attained with single receiver GPS, outside of exceptional surveying grade and military GPS not suitable to consumer navigation and spatial awareness devices. For sighted users, this level of positional error is not relevant due to the users being able to see their surroundings and then follow directions based on their surroundings which compensates for GPS inaccuracy. With visually impaired users, however, the lack of sight makes these GPS inaccuracies become a problem. This challenge is solved by the innovation of SRD and its HPMS.

BRIEF SUMMARY OF THE INVENTION

The device mounted on the wrist, forearm, or head/eyewear should allow for a visually impaired person to successfully navigate any environment containing an infinite range of obstacles. These mounting methods should allow the device to support a wide range of user preferences. The device will use a laser TOF distance sensor to identify the distance from the device to the object from as close as 1 centimeter to any distance beyond that depending on the laser TOF sensor used, typically at least 2-10 meters. The sensor can then convey this information to the user through acoustic or haptic means depending on user preference. This should allow the user to quickly develop 360 degrees of spatial awareness, ascertain the identity of objects around them, and to quickly navigate. The device should also allow the user to distinguish smaller objects closer to the user such as objects on a table. A TOF laser distance sensor is an improvement over many previously used methods of object detection due to its unmatched preciseness at determining object over a wide range of distances and under conditions where convention lasers/optical and acoustic systems are impaired (high air particulates, poorly reflective or opaque surfaces, and translucent and hypoechoic surfaces). A laser TOF sensor is also an improvement over previously used methods such as ultrasonic detection because it measures the distance to a small spot as opposed to a large area. This device can also be used in combination with accelerometers and GPS. These should allow the device to aid in navigation in unfamiliar city areas by providing direction instructions to the user whose location accuracy can be improved through the use of the device. Other functionalities include object location memory and alerting to aid the user in previously scanned objects as they move through an area.

Alternative embodiments of this device could include a LiDAR sensor as opposed to the laser TOF sensor to provide for the same capabilities. In this case, a wide field LiDAR sensor generates a three-dimensional point cloud of distances and motion relative to the sensor. For this embodiment, rather than a utilizing a true optical beam (as with the TOF laser sensor), instead, a virtual beam can be simulated by computing a pseudoAim Point that is co-linear with either the sensor face (e.g., a computed ray line extending perpendicular from the sensor center), or projected from an anatomically mounted or held element with a position and direction that is defined for the system such that a pseudo-Aim Point can be computed and communicated to the user.

Although the present methods and article have been described in terms of exemplary embodiments, none is limited thereto. Rather, the appended claims should be construed broadly, to include other variants and embodiments of the present methods and article, which may be made by those skilled in the art without departing from the scope and range of equivalents of the methods, articles or the methods for using such articles.

BRIEF DESCRIPTION OF THE SEVERAL VIEWS OF THE DRAWINGS

FIG. 6 views 6A and 6B depicts an example of the user utilizing the SRD as a mobility aid. The FIG. 6A depicts a vertical scan path, FIG. 6B depicts a horizontal scan path. FIG. 6A depicts the user utilizing the SRD (600) to sweep vertically to detect for objects with the TOF beam (601). The lower scanning limit (604) is the floor. The upper limit exists as the maximum range that the sensor can detect. The sweeping path is embodied by a sweeping vertical arc (603). FIG. 6B depicts the user utilizing the SRD to sweep horizontally to detect for objects. The left and right scanning limits exist only in the maximum range that the sensor can detect. The horizontal scanning path in 6B is embodied by a sweeping horizontal arc (602).

DETAILED DESCRIPTION OF THE INVENTION

The "Spatial Recognition Device" or "SRD" means a device that provides a visually impaired user with the ability perceive and establish real-time, high precision and resolution awareness of objects and obstacles in their surroundings. It can enable the user to not merely navigate, but also develop spatial awareness of their environment so that appreciate detailed location and topological features. It can also incorporate other sensors, such as but not limited to accelerometers, GPS, Bluetooth (low energy "LE" Bluetooth) or ANT+ beacons, and data processing elements (GIS, topology calculation, storage and analysis), and audio (tone/speech) or haptic feedbacks to aid the user maintaining ultraprecision location and navigation, and self-generated mapping and alerting and location of objects and obstacles. The SRD preferably is mounted to the user's wrist, arm, or head through a lightweight mounting system.

Figure 1:
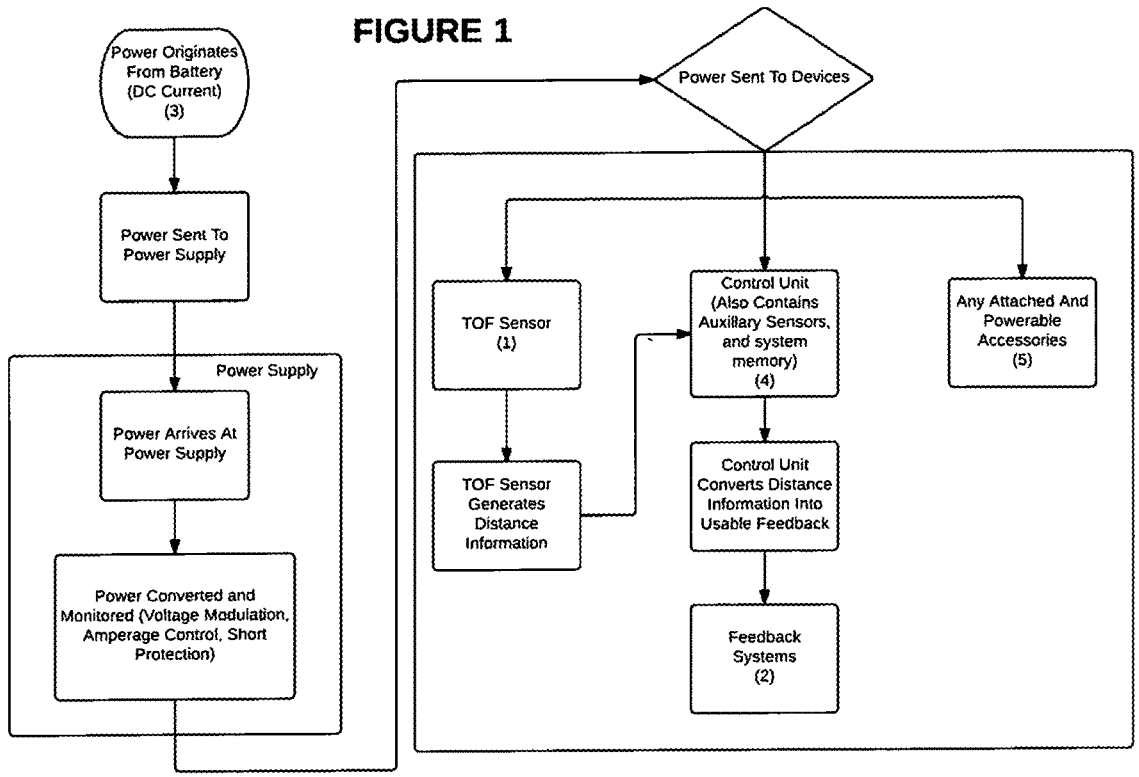
FIG. 1 depicts an exemplary chain of power usage and the generation and usage of sensor output for the most basic embodiment of the SRD.
Figure 2:
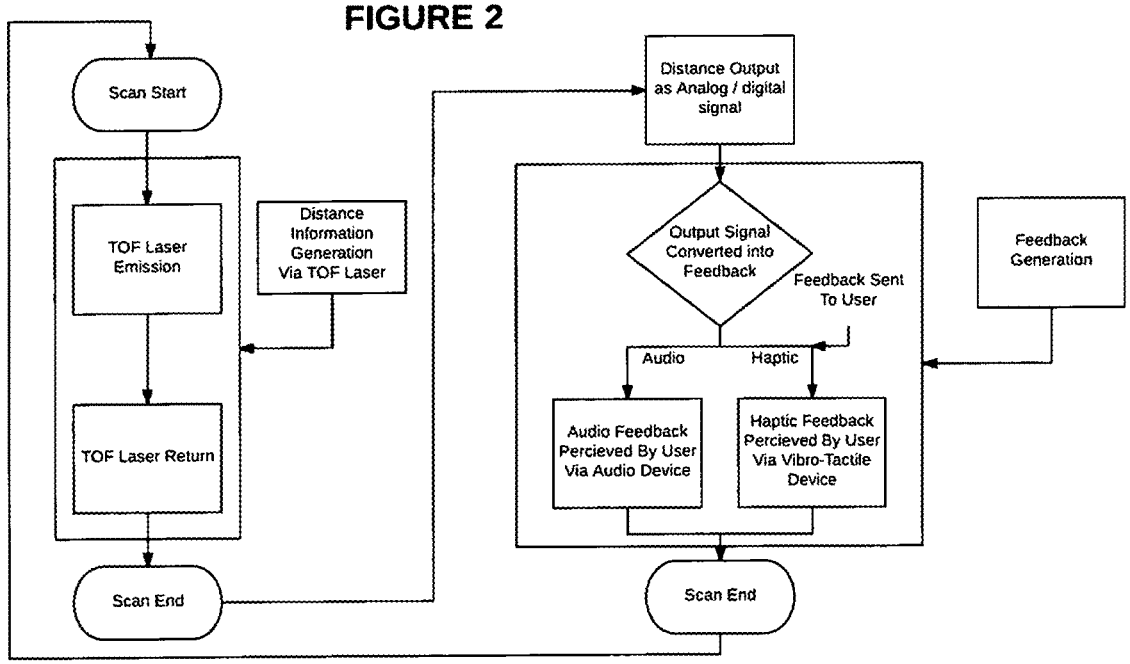
FIG. 2 depicts an exemplary the process in which the sensor conducts a scan to determine distance from the sensor to the target and then provide feedback to the user. Feedback provided can either be haptic or audio in nature.
Figure 3:
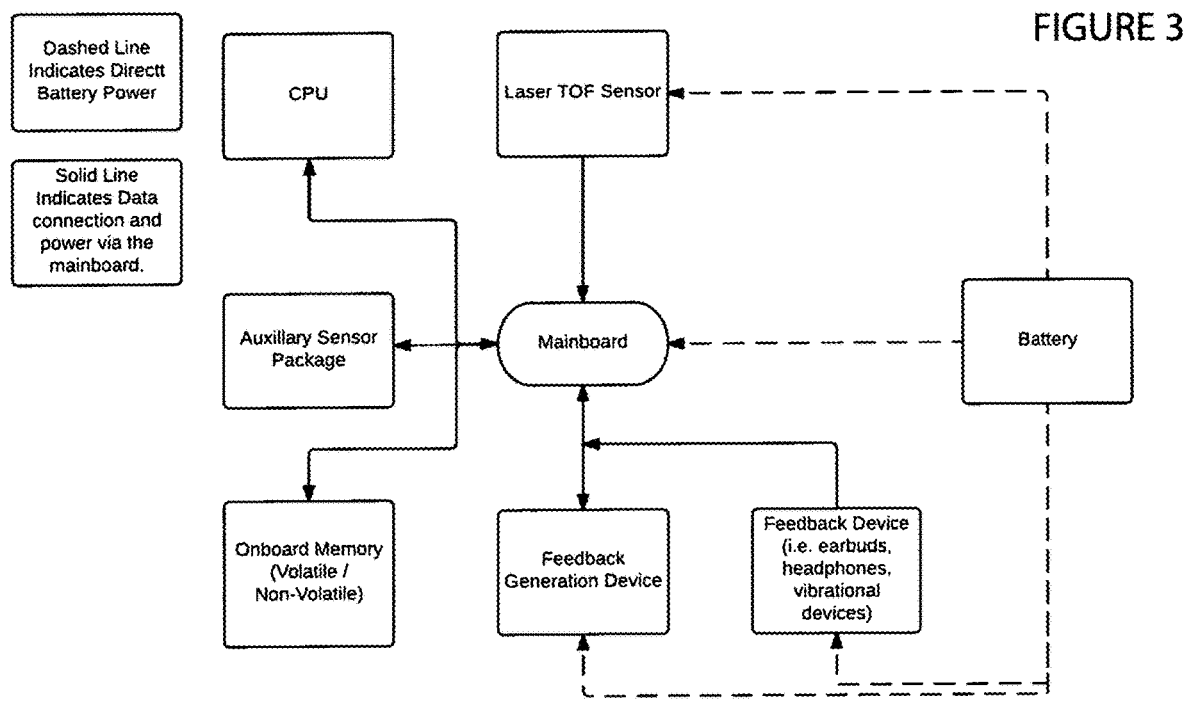
FIG. 3 depicts a basic flow diagram of the SRD's hardware. Computations are performed with an array of chips, sensors, and hardware components attached to a main board. Sensor information is received in these components, converted into user feedback, and then sent to the feedback systems. All of the components powered either directly by the SRD's main battery or via circuitry power connections on the mainboard (which are supplied powered by the main battery).
Figure 4:
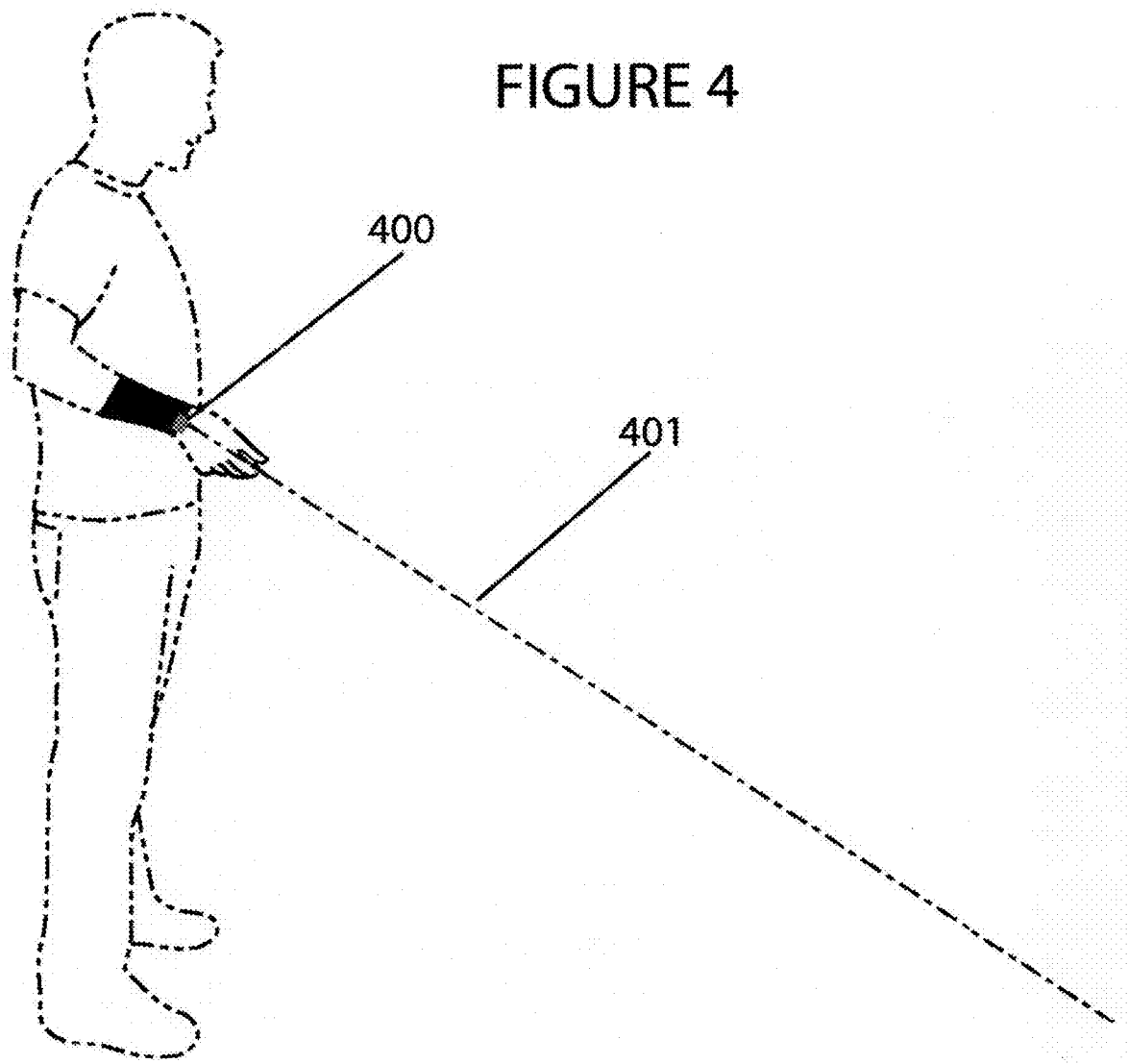
FIG. 4 depicts an example of the SRD system being used to scan for objects ahead of the user. The TOF sensor (400) projects an infrared beam (401) ahead of the user to determine the distance to objects ahead.

In FIG. 1, shows the power chain for an example of the most basic embodiment of SRD. The SRD includes a TOF laser distance sensor <1>, a feedback system (audio or haptics)<2>, a power source <3>, a control unit <4>, any attached accessories <5>. The TOF distance sensor <1> includes a laser light source, a receiving sensor for the reflected laser light, and a precise clock to measure elapsed time from laser emission to return. An exemplary TOF laser/sensor is the SICK Dx35 series sensors. These sensors have exemplary range (50 mm up to 35,000 mm), accuracy, and possess an invisible infrared laser. This sensor provides an analog output of <4-20 mA and 0-10 V.; 2.5 ms response rate) which allows for precision measuring over ranges of 50 mm to 12,000 mm. The computational system <4> receives TOF laser signals from TOF sensor <1> conveying depth information from the TOF sensor and stores the information in the system memory <4> as a polar coordinate (angle from the user and depth). The computational system also receives, modifies, and then passes this analog signal to the feedback systems<2>. FIG. 2 shows the process for the scanning, processing and feedback process following this process.

Additionally, the SRD optimally improves on the concepts of the art in several other respects:

1. The acoustic or haptic feedback is modulated by transforming equations. For example, feedback output of close objects is at a higher frequency, amplitude or pattern than distance objects. Performing narrow field or recursive scanning (over a small area) is used to adjust the feedback gain (e.g., the difference in response output relative to changes in detected changes in distance). These can be fixed, programmable, or adjustable.
2. Combining the SRD with accelerometers and/or GPS and/or other inputs and GIS (geographic information systems) to use the distance feedbacks from the scanned objects in the users environment (buildings and other large defined objects) to calculate very high precision location (by triangulation relative to known objects around the user, as determined by GIS systems) for the user to assist in navigation and map object location (distance to a corner, bus stop or door) not feasible under conventional GPS and similar other precision location methods such as beacons/Wi-Fi/cellular enhanced GPS systems which rely on non-constant environmental data. Other sensors include voice commanded computer aided visual recognition and/or guidance systems, such as those that can read signs and signals, or inform the user of the presence, location or description of specific items. These systems are improved by linking into the high precision positioning and mapping the system supports.
3. Combining with an accelerometer/level, compass, scanned data storage and mapping system to maintain a real-time updated spatial map of scanned objects and surfaces such that the system can alert the user of approaching near a previously scanned object or obstacle that is now close enough to result in an imminent collision (based on change in position, locomotion speed to present a hazard (e.g., table, stairs, or cabinet)).
4. Use of non-handheld (e.g., wrist, finger, head/eyewear) mounted sensor too maintain discrete use.

The SRD can contain additional sensors including a compass, a GPS, and an accelerometer. These sensors enable the SRD to assist the user in multiple functions. A GPS sensor to determine the location of the user on a global map. The user can either utilize the integrated GPS in their smartphone or utilize an auxiliary GPS such as Adafruit Ultimate GPS Breakout. The SRD can utilize a compass sensor such as Adafruit HMC5883L Breakout to determine sensor orientation relative to the user. Also, the SRD incorporates an accelerometer to determine user movement and directionality of movement as well as determining sensor tilt. An example of this sensor embodiment is one such as MMA7455 3-Axis Accelerometer from Parallax Inc (Section 104 of the user manual describes the specific usage instructions of these sensors).

Figure 5:
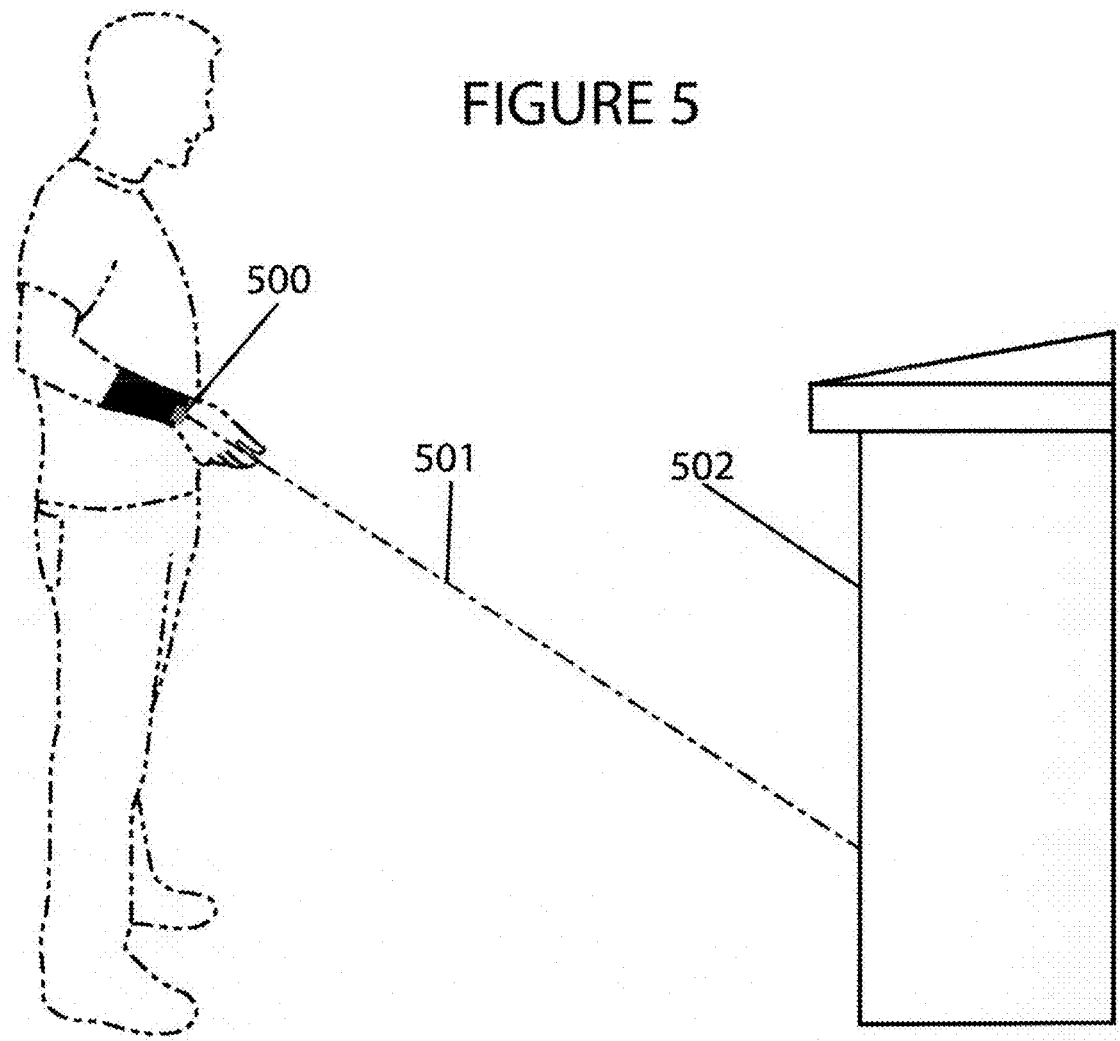
FIG. 5 depicts an example of the SRD being used in the presence of a large detectable object. The infrared laser (501) project from the TOF sensor (500) contacts the object (502) and is reflected back to the sensor to determine distance.

A preferred embodiment includes mounting the SRD to the user's wrist, forearm or head in any way, as illustrated in FIGS. 5 and 6. This makes it easy to scan vertically (FIG. 6A) or horizontally (FIG. 6B) or other arbitrary directions, the key pointing being scanning should cover the area for which information is to be acquired. As well as the user perceiving audio feedback delivered through in ear audio device, a bone conducting audio device (Trekz Titanium), or an around the ear audio device (further described in section 100). Also, the user perceiving haptic feedback through vibro-tactile (such as small vibrational devices like 28821-ND from Digi-key) devices placed anywhere on the user's body according to the user's explicit preference (further explained in section 100). Both feedback methods would not be used concurrently, but which is used can be selected by the user and changed quickly if the user so desires.

Another preferred embodiment includes a user toggleable gain adjustment (the relationship between the distance value and user signal for that distance) for the TOF sensor output to allow the user to modify feedback signals so that they may use the SRD device to its full potential over longer ranges as well as closer ranges, and when several objects are close or far in distance to each other. A gain adjustment would amplify more minute changes in distances than closer ranges allowing the user to easily distinguish objects. An automatic gain adjustment function (auto-gain) can also be implemented. A preliminary method would be use trailing average of recently scanned distances over a time period to calculate a gain value best suited to the recent average distance, and changes in distance. For example, if for the most recent 30 seconds, the average scanning distance was 1 meter with standard deviation of 20% and movement of 1 m/s (walking), the gain would be set to maximize discrimination of changes at that distance and range of change. Changes to those values (e.g., change in speed or encountered object distances) would trigger a proportionate change in the gain. In addition to embodiment is a user toggle background suppression to also assist the user in identifying closer objects by excluding any sensor data outside a defined distance. These toggles can be embodied in two separate infinitely adjustable sliding switches, dials, touchpad, or other comparable mechanism.

The SRD would include an on/off switch to allow for the device to save power and stop feedback when desired, and may have an auto-off or reduced energy state when device motion (as calculated by change in distance or by an internal motion sensor) is below a set threshold. The SRD could also include multiple control buttons. For example, four buttons for four different user preference values for gain and background suppression values allowing for quick adjustment based on different background types. To set a user preset value the user would adjust the gain and background suppression sliders to desired values and then press and hold the desired preset button for 3 seconds. When one of these preference values is used (by pressing one of the setting buttons), the gain and background suppression sliders values will be disabled until the user preset value is deactivated (pressing the button again). The buttons consist of a rigid center post surrounded by a depressible circular ring. When a button is pressed to activate a preset value only in the ring around the rigid center post will depress, the ring will stay depressed until it is pressed once more which will allow it to rise. This allows a visually impaired user to determine which preset is active due to the rigid center post being easily felt when the surrounding ring is depressed. It should be understood that the term button or switch (or the like) can mean any form of user activated mechanical, electronic or virtual control, such as but not limited to buttons, switches, sliders, gesture or voice command inputs, operatively interfaced with the SRD whether on the device, its mount, elsewhere on the user or on an ancillary device (e.g., a smartphone app). Also, such buttons or other controls can have multiple fixed, contextual and/or programmable functions.

A preferred embodiment is an SRD preferably powered through a lightweight high capacity power cell (e.g., Li—Po, Li-Ion, standard batteries, etc.) that is housed in the mounting system and preferably is easily removable and replaceable with another power supply to allow the user to carry extra batteries for the SRD in the case of battery depletion. The SRD power system includes a voltage input regulator to ensure numerous TOF sensor types can be utilized A conventional non-rechargeable battery could be used in a designed housing, but would be less useful for a continuously used product due to the ongoing cost and added weight. SRD Batteries can be designed for plugging into a charger or charging station (including containing receiver for wireless inductive or resonant charging such as receiver for chargers to the Wireless Power Consortium Qi or Airfuel Alliance standards or provide a plug for a power connection (e.g. USB or DC)

Figure 7:
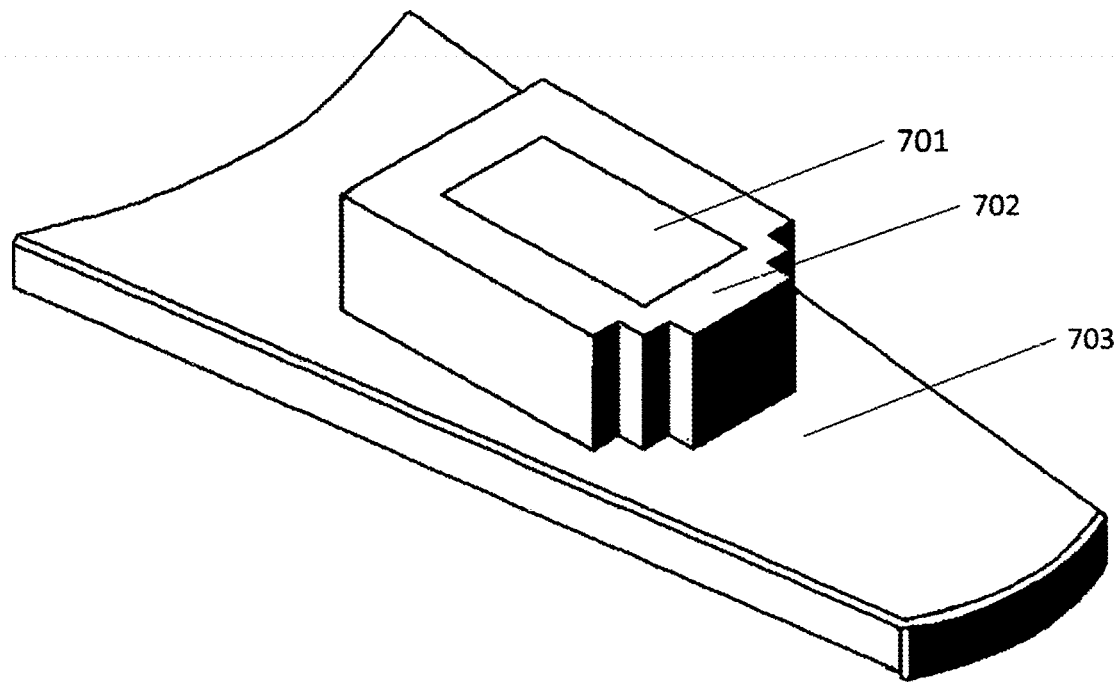
FIG. 7 depicts an exemplary mounting panels (703) for the SRD in a form that allow the SRD and mount to be separated (however this is not required and they can be a single unit or non-separable). It includes a base panel (703) made of lightweight plastic or other suitable materials (e.g., metals, ceramics) or combinations of materials, that allow the panel to be couple to the user (example by sleeve or strap, clasp, cuff or headband) or user assistive (wheelchair). The mount in this example, features a raised projection (702) that serves as the male coupling for mountable attachments. At its core is a coupling mechanism (701), in this example, a strong magnet, that can hold the male and female ends together. These panels will be integrally attached to the wearable fabric sleeve.
Figure 8:
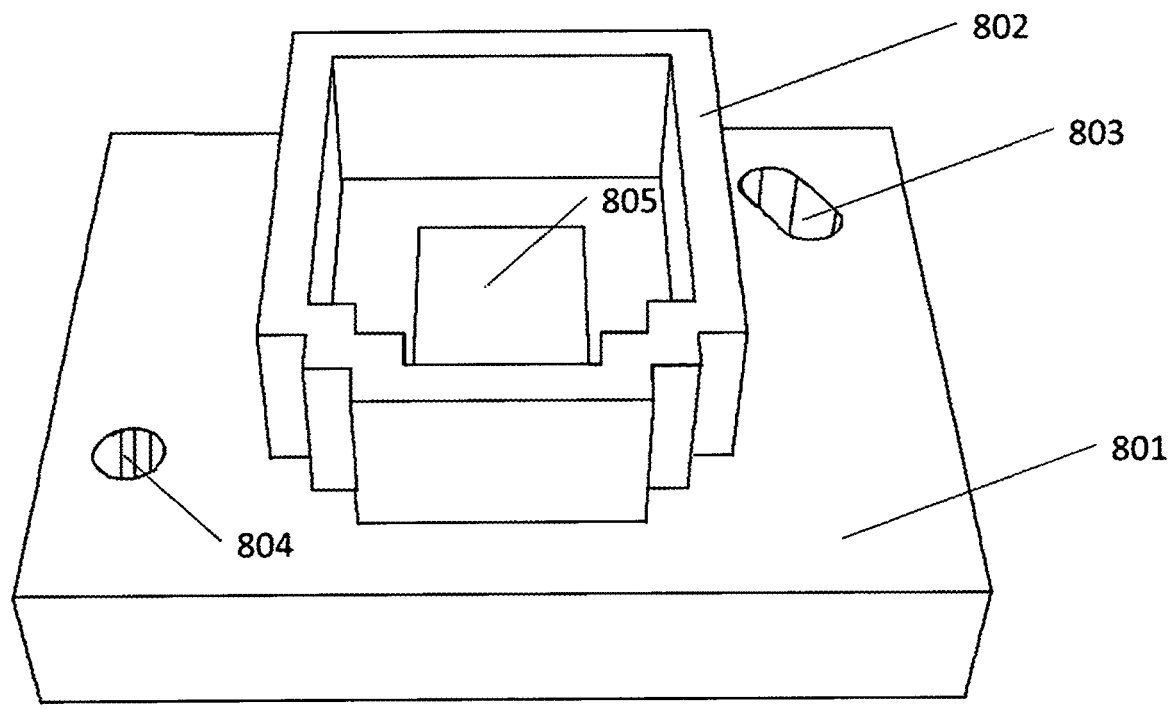
FIG. 8 depicts an exemplary SRD sensor mounting plate that allows SRDs or other components to be coupled to the mounting panel. It is made of lightweight plastics or other suitable materials (e.g., metals or ceramics) or combinations of materials. In this example, the base plate (801) features a raised projection (802) that serves as the female coupling end for mountable sensor or other devices. In this example, the coupling mechanism is a strong magnet (805) that can hold the male and female ends together. It can includes adjustable holes (803) and fixed holes (804) for attaching SRD and other modules, however, this is an example and other effective forms of attachment (eg., adhesives, Velcro, clips, clamps, twistlocks, magnets, pins, press-fits) are also contemplated.
Figure 9:
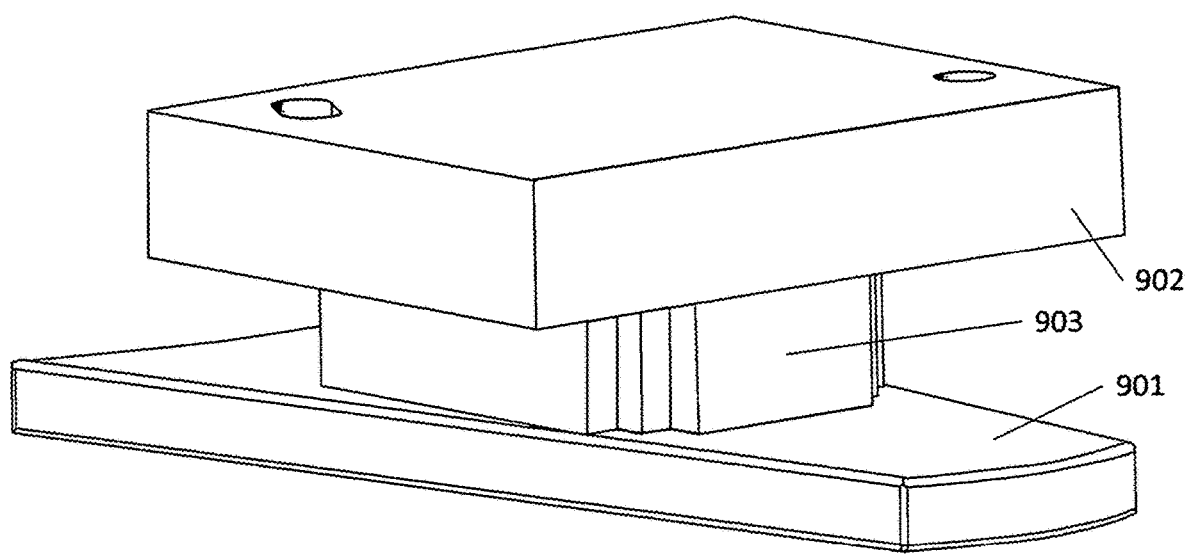
FIG. 9 depicts an exemplary coupling (903) of a mounting panel depicted in FIG. 7 (901) to the SRD mounting block depicted in FIG. 8 (902)

SRD Mounting hardware is made of lightweight plastics such as 3D printed material and expandable/stretch fabrics. A preferred embodiment is a system with housing and mounting elements of plastic, metal, ceramic (or other suitable material) panels (FIGS. 7-8) attached together with stretchable fabric, like compression wear sleeves allowing the device to snugly, yet comfortably, fit the wrist or forearm of any user (different sized sleeves may be needed for users with unusually large or small forearms). Each panel is capable of supporting the TOF sensor allowing for multiple mounting options to suit user preference. The TOF sensor is to be mounted to a sensor mounting plate (FIG. 8) that is attached to the integral mounting panel, preferably via the use of a magnet (although a unitary module, or mountings with other means, including but not limited to Velcro, clips, snaps, latch, pin or spring retainer). Unused mounting locations for the TOF sensor would be used to mount the computational system, auxiliary sensors, and any future released devices and attachments. Wrist, forearm and head mounting options would encompass slight differences. The system battery is to be mounted in a secure integral pouch of the stretchable fabric.

Optimally, the sensor would be mounted on a user adjustable pivot or gimbal (or otherwise adjustable in direction). On a wrist/back of hand mount, this would allow for scanning by small rotations and movements of the lower arm/wrist while standing or walking. This allows a motion that is discrete, and more importantly greatly reduces the repetitive gross motor motion and stress on the elbow, shoulder and back involved in scanning by holding the hand/lower arm in an extended position such as required for many handheld and arm mounted devices.

A High Precision Measurement System (HPMS), namely a true "Time of Flight" (TOF) laser sensor. Use of a TOF laser sensor allows the user to determine distances with pinpoint accuracy in a single defined point. This allows the user to almost reach out and "feel" their surroundings to determine what's around them. The use of a pinpoint sensor allows the user to also scan with a high degree of directionality. To accomplish this a TOF sensor uses a precise clock function to determine the time taken for emitted light to hit a target, reflect and return to the sensor thus generating a distance. The sensor should then output this distance information in the form of a standard analog or digital output.

High-resolution Spatial Awareness through manual scanning. By using a HPMS, with its narrow high precision beam and sensor method, with manual scanning and continuous real-time acoustic or haptic feedback, the user can readily gain a spatial awareness of surfaces, objects, and voids with very high precision as well as edge and size resolution in close (several centimeters) to extended ranges (several to many meters). The user effectively can rasterize their environment by continuous scanning and feedback. Importantly, through this approach, the user is getting more than mere "collision" avoidance." Rather, they perceive the spatial details of surfaces and objects around them at general resolution (loose sweep) of area or higher precision (concentrated recursive scanning of an object or area).

The terms "High Precision Measurement System" or "HPMS" as used here means a measurement system possessing the following characteristics:
1. Ability to detect object edge and distance with a repeatable resolution of not more than one centimeter in close ranges (1 m) and optimally less than 2 cm, and not more than 5 cm at longer ranges. Resolution here means the system feedback indicating an edge occurs such that the edge position is as indicated is within the stated difference form the actual edge;
2. Response time between 1 ms and 100 ms;
3. Resolution not materially affected by object color, reflectivity/absorbance so long as a signal remains detectable (e.g., at least 6% signal remission;
4. Measurement Repeatability should not exceed 90% remission (optimally reflective target)—not more than 1.5 cm at 8 m at a fast response time (2.5 ms) and not more than 0.7 cm at 15 m at a slow response time (100 ms); 18% remission (suboptimal reflective target)—not more than 1.5 cm at 4 m at a fast response time (2.5 ms) and not more than 1.5 cm at 9 m at a slow response time (100 ms); and
5. Class 1 through 2 M laser infrared of visible or (preferably) nonvisible wavelength.

"Aim point" In discussion of this system, the term "Aim Point" (whether or not capitalized) means the actual or calculated direction where the HPMS is measuring distance such as the point on an object returning signal to the HPMS, and for which the user perceives to be pointing the sensor and getting distance feedback. As discussed elsewhere, in the case of an optical or LiDAR based HPMS, the Aim Point can be a calculated center point in such sensor field of measurement or virtual Aim Point based on the position and pointed direction of a pointing element (a wrist, finger or head/eyeglass mounted element), for which its position and pointing direction are communicated to the HPMS data computing system and perceive by the user such as HPMS feedbacks can be made relative to the pointing element.

"User Assistive" means an object operatively associated with the user, which in use maintains a generally consistent position and orientation relative to the user (e.g., eyeglass, head mount, wheelchair, scooter or other user mobility device).

"Non-visual precision spatial awareness device" refers to a machine that includes the described elements and systems, which may be contained in one more discrete modules or units, mounted as a single physically integrated unit, as separate but operative connected units (e.g., by wired or wireless connections), including elements that may be provided by a computer or electronic device not physically connected with the user (e.g., a remote computer or data server).

Feedback Description The analog or digital output signal can be converted to audio or haptic feedback (depending on user preference) which allows the user to quickly and easily identify the distance to the target. Audio feedback can be delivered in the form of a variable tonal pitch, pattern or volume via bone conducting headsets or wireless/wired earbuds. Haptic feedback can be delivered via vibro-tactile sensors that can be placed in an area determined by user preference, or mounted under the device and so felt by the area in contact. When the sensor reads a distance closer to the user it should deliver a higher pitch, or a more intense, or variant vibration, and more distant objects would result in lower pitches, less intense or variant vibrations. For instance, a tonal or vibration intensity spike while swinging the arm, or head would indicate an object in close proximity. Also, the user, albeit more experienced users, should be able to identify objects solely based on patterns of tonal and vibrational intensity spikes and drops.

Basic Functionality The core functionality of the SRD is to be able to dramatically expand on user experience as that of a white cane in regards to close object/obstacle detection and avoidance during locomotion. By sweeping the ground ahead of the user while walking (FIGS. 5 and 6A-6B), they would get continuous feedback. This would ensure at the very beginning, before the expanded functionalities are learned and mastered the user could at the very minimum navigate and avoid obstacles. For this functionality, the user should move their arm in a fashion exactly the same as they would move a cane, a long swinging arc. The user should continue this motion indefinitely while monitoring the received feedback. Feedback spikes and intensity changes should allow the user to identify obstacle locations and then avoid them. Optionally, the system can be set for suppression of items more than a user specified distance (e.g. 2-3 meters) so the user can move with less distraction of information on more distance objects. It similarly can be set to focus on shorter distances (searching a table) or longer distances (building for entrance). Optimally this can be based on user handling behavior, such as slow scan or quick recursive area scan (as measured by accelerometer, or trailing time weighted auto-gain function in which the average distance for the most recent 2-3 seconds) adjusts the signal response to changes in distance and increases/decreases sensitivity of feedback for distance variance, such as based on average distance scanned within the scanned area or time.

Object Identity Determination While the user is conducting the sweeping motion of the basic SRD functionality or while purposely searching for objects specific (such as when walking into a room and looking for a chair) the user should be able to utilize the feedback patterns to ascertain the identity of the objects being scanned. Object identification through feedback patterns can be split up into two methods, active and passive object identification. A passive object identification would occur when the user is conducting general navigation through environments, such as when the user is walking down the street. While the user is navigating through obstacles that may occur on the street, such as people or construction related obstacles, (these obstacles would be reflected by the SRD in the form of feedback shifts conveying distance spikes) they should be proceeding until they reach a stop light post indicating a street end.

While they are using the SRD to navigate the user should be able to wait to sense a specific feedback pattern that would be indicative of a stoplight. A feedback pattern indicative of a streetlight would be, for instance, a quick tonal spike (indicating the first scanned edge) followed by a gradual tonal increase (the curve of a streetlight) followed by gradual tonal decrease until the tone drops (indicated the opposite edge). This type of identity determination would be considered passive identity determination due to it occurring during general navigation.

An example of an active object identification approach would be the user searching for a chair upon entering a room. The user could quickly sweep the entirety of the room listening for a quick staccato of four feedback spikes (indicating the closely spaced four legs of a chair) and a long continuous feedback response indicating the chair back. A table would give a similar feedback pattern however the spikes would be occurring farther apart due to the size of the table legs, their distance apart, and the larger top; this would allow a user to discern between the two) and then navigate to the object. It is patterns such as these that the user should develop rapid object recognition over long term SRD use. Over time the user should find themselves able to quickly identify objects in their surroundings by their apparent shape, allowing users to develop a spatial awareness of the objects around them, previously inaccessible to the visually impaired. Similarly, other objects, such as a glass or a pencil on a table, have its own spatial signatures the user should recognize through experience and intimate knowledge of SRD settings.

Small Object Identity Determination Another SRD function is to enable active object identification to determine the location of objects on a table, by allowing the user to sweep the SRD device scanning at a slower pace and area appropriate smaller object size (such as small areas and speed for smaller objects). Due to smaller object sizes the user would need to first adjust the feedback gain, or the system would automatically adjust the gain as described above, so that smaller changes could be more easily distinguished based on slower scanning sweeps over a smaller area. Small items such as writing utensils could be distinguished by their feedback response of one quick tonal or vibrational spike due to their small cross sections. Objects such as a cup would feature a longer more constant feedback spike that ascends in intensity and then descends (curve of the cups surface). Larger objects such as a book would be identifiable due to the constant feedback drops when scanning their edges and less change along the flat surface.

Additional sensors and features Other embodiments of the SRD incorporate one or more of the of the following: a GPS, an accelerometer, level detector, compass, altimeter, beacon detectors, Optical Imaging and Information System (OIIS), a secondary wide angle detector (SWAD), data communication system ("DCS"), and an onboard or remote/cloud (a cloud computational system can be implemented allowing for simple computations to take place locally on the onboard computational systems whereas more complex computations requiring more computational power can be uploaded and done on a cloud based server with the response being returned to the SRD) computational system to aid in path finding and collision avoidance and/or enhanced object location and recognition. These computations will be used to enable the SRD to perform a wide range of functions to assist the user. a storage device can store computer readable instructions which when executed by the processor can cause the processor to implement any of the features described herein. Also, these elements can be directly incorporated into or attached to the device module, or interlinked (with a wired or wireless connection), by placing them elsewhere on the user as a dedicated module (or group of modules) or by interlinking to a third party unit (e.g., smartphone, such as Apple iPhone 6, Samsung Galaxy 6) that has these elements and that provide APIs to allow wired and wireless interlinking and access by third party Apps and off-system hardware.

GPS In one embodiment, the SRD's GPS device would allow the user to select a destination and receive walking directions. GPS data is incredibly accurate in regards to object size, however, user placement on a map in its current state is not accurate enough to allow a blind user to rely on it to instruct them when they are in front of a certain location, such as a shop on a long street. User triangulation based on distances from defined objects in their surroundings (buildings) that provide precisely mapped datum points, enable SRD to place the user with high precision within the approximate location zone obtained from the GPS and/or other sensors inputs. The use of these other sensors to provide approximate location and orientation massively reduces the computation needed to resolve the calculation of precise location, by reducing the possible scan map and triangulation and error testing solutions to those that would fall within the approximate zone and orientation, and the identity of the surrounding objections. For example, using the GPS sensor, or a beacon, the user can be placed a location zone X, with a probable radius from center of Y (the User Position Zone or UPZ).

Using the compass and accelerometer/tilt sensor, and calibrated distance from ground (by aiming downward to get height from ground to device), the orientation, tilt angle and height of the device can be established. Compiled data in the GIS database, will provide specific distance and contours of mapped objects (e.g., buildings and other fixed landmarks), subject to the variance of the UPZ. When the user scans a reasonable portion of the horizon around them (usually 30 to 270-degree arc, preferably upward to minimize measurement interference from unmapped objects), will provide a horizon contour of distances to mapped and unmapped objects. This data can be combined with the tilt device orientation, tilt angle and height during scanning to enable ready trigonometric calculation of a normalized flat distance from the user to said angular contour points, to eliminate variance due to non-level hand movement.

Most of the data points coinciding with interfering unmapped objects (passing vehicles, people, birds, signs, gaps between buildings) can be eliminated by censoring out data points that are outside of the min/max distance between mapped objects and the UPZ. Remaining data points can be smoothed by removing objects that based on scan criteria would not be mapped, such as an object size being less than a threshold limit to be included as a mapped object (e.g., a telephone pole or parked vehicle, compared to mapped building contour). The remaining discrete data points can then be readily smoothed and resolved into distinct contours of scanned landmarks. These comparatively few contours having known distances from the device, can then be compared to the mapped contours. Because the number of contours are few, and have precisely known distances and orientations from the device, reduces the solution of the precise positional point within the UPZ to a readily computed statistical best fit calculation. From this point, continued precision can be maintained with the compass and accelerometer inputs and periodic scan updating if recalibration is needed. With the user position and orientation determined with high precision, the invention can direct the user and communicate surrounding objects with accuracy on a level similar to what a sighted user would enjoy.

Accelerometer, Level, Compass and Altimeter One embodiment, has an interlinked or attached accelerometer combined with onboard computational system would allow SRD to warn the user of an imminent object location and collision so the user can avoid it if they haven't already. A compass module can be incorporated to provide increased assurance on direction to support position and orientation of the user to the mapped positions. An optional altimeter, would similarly enhance positional resolution in situations where an accelerometer or GPS might face challenges, such as same point on an elevator, or same place on different floors of a building or disruption/interference of those functions during movement. While the user is navigating, any objects scanned with the SRD should have their size and location stored as a polar coordinate with the user placed at the origin. If the user while they are moving, fails to move out of the way of an object before they contact it, they can be alerted by the SRD that there is an object in close proximity that must be avoided. This would prevent a distracted user from accidently running into an object. The accelerometer/level data (alone or assisted by the compass and/or altimeter modules) would allow the system to track the user's location relative to scanned objects so as to determine when the user would collide with an object. Any objects that have changed location between passes would be flagged as moving objects and then disregarded due to their unpredictable nature. These sensors provide data inputs that can be fused with the distance sensor to build a local map of the area scanned and objects within it. For example, they provide high precision location (latitude, longitude, altitude) and orientation (compass and angle off inclination/declination) of the device relative to the laser scan point, and thus also by calculation, the scanned object. If linked to a computation and voice navigated system, with a user input means (e.g. a button or voice activated cue) the user could also note object position by scanning the object and calling the object name out (e.g., push annotation button or voice command while scanning a target or holdings a position and providing the annotation as in "Front Door" or "Bus Stop" or "Trash Can". They can later query a digital assistant such as a common voice activated information platforms (e.g., SIRI (Apple) or Cortana (Microsoft). The user would ask "where is the trash can", to which the digital assistant can then answer "four feet in front of you at 20 degrees right", by comparing the users current position and stored location of the object (from a prior scan) and calculating direction or directions to communicate to the user. Inputs from the accelerometer also can be used to calibrate the SRD position and orientation relative to the user's overall anatomy, so that the assessment of objects and collision risk can be calculated and managed. For example, the SRD can be held at defined "calibration" position, such as against the center of the user's chest or abdomen (e.g., at the xiphoid process or navel) and pointed directly down to the ground. From this calibration position "user envelopes" can be defined, such as a series of cylinders extending outward from the calibration point to encompass the user's body and set distances, for example of critical (e.g., user cylinder plus 30 cm), alert (+1 M) and elevated awareness (+2 M). When the SRD is calibrated, the SRD changing position relative to the calibration point (from active scanning motions) is maintained and used with the measurement data and mapping system to monitor objects and obstacles relative to the envelopes, and then triggering defined actions (alerts, feedback changes). Optimally, the data from the mapping system and other sensors (e.g., the SWAD and/or OIIS) monitors and calculates the relative position and/or motion of the user and/or scanned from mapped objects and obstacles and calculates a risk of collision with the those envelopes and may also calculate the projected velocity at intersection so that the intended low velocity collisions (e.g., approaching a door slowly to open can be differentiated for an unintended hazard (e.g., approaching a narrow pole in the critical envelope zone at a high walking speed. The data on the actual or calculated intersection between an object and the user or defined envelope, can be used to provide variable defined alerts to the user or explicitly communicate (via haptic, audio or spoken system to user communication) on the actual or projected zone of intersection, and/or relative direction, height and/or speed of the object and user at the actual or projected intersection point and/or projected time of and/or distance to intersection.

Data communication system (DCS) One embodiment includes a data communication system that allows the sensors to communicate with the data processing system as well as other external data processing, storage and information systems (e.g., GIS, device mapping creation, storage and retrieval system, internet based object or direction information), secondary devices (e.g., smart phone). The DCS can be based on Wi-Fi, cellular, GPRS/radio, Bluetooth, Bluetooth LE, ANT+, hardwire (e.g., USB, TCP/IP), or other suitable data communication interface and protocol. A DCS can be used to communicate device events such as periodic/scheduled user (device) location or movement history, device functional status (a device heartbeat), user triggered communication (help call), or event trigged (accelerometer indicates movement exceeding a G-force associated with fall or collision, GPS or other system data analysis indicate location in unexpected area), external triggered (signal to device for status report or location).

Optical Imaging and Information System (OILS) One embodiment, has an attached or interlinked OIIS such as those available under (such as iPhone and Android Apps, Google Glass). In this embodiment, the OIIS is able to detect the laser beam (infrared spot detection, or by calculation of beam direction) and can be queried for a description (e.g., object identity, text reading, color). Alternatively, by interlinking with the precision location and orientation information from the system, the OIIS can be queried about the location of a specific object in the OIIS detection field and provided user the location and direction/navigation. Also as a wide-angle detector (but with reduced location precision), the OIIS can be set to alert to close by and emergent objects that may present a collision hazard missed by the user scanning or awareness.

Secondary Wide Angle Detector ("SWAD") One embodiment, has an attached or interlinked secondary ultrasound detector. The SWAD would provide continuous wide angle (in both x and y dimension of object detection, preferably set for short (1-2 meters) of emergent objects, and with a feedback distinct from the primary laser system, and preferably where tones or haptic feedback provide direction and distance insight. This module would provide the benefit of low precision wide-angle detection to alert the user of objects overlooked or preventing imminent collisions with objects in the user's path. (e.g., user is sweeping low and does not scan an emergent head level object). If co-linear with the primary laser, the SWAD can enable an initial general target detection, that the user can quickly interrogate at high precision with the laser. SWADs can include commonly available sensors based on ultrasound, optical or infrared sensing. It is important to note that these sensors serve as an auxiliary sensing device to the main HPMS. A system relying on the sole use of a wide-angle detection sensor, such as the one described by Aditi Harish (US20160275816A1) is not sufficient to provide the precise locations of objects but instead a rough position. Thus, these designs still require the use of a white cane.

Beacon Detector One embodiment, has an attached or interlinked beacon detector. Beacons are devices or system preplaced at locations or attached to moveable objects (e.g., keys, phone, guide dog, briefcase . . . ) that allow awareness of their presences or location. Beacons can use various communication means, such as optical (e.g., infrared or visible signals) or radiofrequency (e.g., Bluetooth or Bluetooth LE, ANT+, Wi-Fi, passive and active RFID frequency). Beacons are coming in to increasing use for these functions. For example, small token beacons (e.g. TILE, iBeacon) can be attached to objects and use Bluetooth LE and/or Wi-Fi to provide location information and beaconing when a user searches. Location beacons, such as Bluetooth LE and RFID beacons are also coming into increasing use to provide beaconing to devices in retail and commercial settings (e.g., to alert or guide user to product promotion and/or location). Other beacon placements of importance include geographic features such as street crossing points, and specific buildings. By interlinking beacon detection with the laser sensor and/or other modules, enables the user to optimize location and navigation relative to the beacon.

SRD Control Device, SRD App The device can be interlinked to a secondary internal or external control devices such as computer, earpiece or smart phone, or touchscreen, accelerometer, IR or other sensor capable of detecting and analyzing motion of one of the user's hands or fingers, so that its functions can be adjusted, tuned or extended based on user preference or device enhancement, such as allowing for voice commands ("on", "off", "gain up, "gain down"), voice queries ("battery level"); hand or finger gestures/motion (cover sensor for three seconds to turn off, shake to turn on) and provide system spoken or haptic feedback, integration with other applications on the SRD or the control device.

CITATIONS

CHRISTOPHE JACQUET: "People and Computers XVIII—Design for Life", vol. XVIII, September 2004, SPRINGER-VERLAG, article "A Context-Aware Locomotion Assistance Device for the Blind", pages: 315-328, XP019008268
J. MALVERIN BENJAMIN: "The Laser Cane", BULLETIN OF PROSTHETICS RESEARCH, 1974, pages 443-450, XP002006043
US20080309913A1; Jun. 14, 2007; Jun. 16, 2008; James John Fallon; Systems and methods for laser radar imaging for the blind and visually impaired
US20160275816A1; Mar. 18, 2015; Nov. 27, 2015; Aditi B. Hanish; Wearable device to guide a human being with at least a partial visual impairment condition around an obstacle during locomotion thereof
U.S. Pat. No. 5,487,669A; Mar. 9, 1993; Jul. 7, 1993; George F. Kelk; Mobility aid for blind persons
US20130220392*; Mar. 22, 2013; Aug. 29, 2013; Mesa Imaging Ag; White Cane with Integrated Electronic Travel Aid Using 3D TOF Sensor
DE202006008277U1; May 24, 2006; Nov. 16, 2006; Ritzler, Sebastian; Control stick for guiding a blind person has a swivel mounted powered wheel and proximity sensors to steer a path around obstructions
US20070018890*; Jul. 21, 2006; Jan. 25, 2007; Kulyukin Vladimir A; Multi-sensor wayfinding device

I claim the following:

1. A non-visual precision spatial awareness device, comprising:
   an HPMS having a single time of flight (TOF) laser sensor emitting a single narrow beam;
   a mounting for said HPMS or a pointing device secured to the user's wrist or forearm and that does not interfere with the use of said user's hands or fingers while in use and permits said user to direct the sensor Aim Point with the device providing feedback based on the distance from the sensor to an intersection of said beam with an object or obstacle; and
   an acoustic, audio and/or haptic user feedback system in which said feedback is continuously varied by the relationship between the change in distance to the change in the signal characteristics (amplitude, frequency, or pattern) such that the change in one or more of the signal characteristics varies with scanning distance.

2. A non-visual precision spatial awareness device of claim 1, wherein said HPMS and/or the pointing element is mounted on the wrist or forearm such that the user can perceive the direction of the Aim Point and can change the Aim Point relative to mounting point.

3. A non-visual precision spatial awareness device comprising:
   an HPMS having a single time of flight (TOF) laser sensor emitting a single narrow beam; a mounting for said HPMS or a pointing device secured to the user's wrist or forearm and that does not interfere with the use of said user's hands or fingers while in use and permits said user to direct the sensor Aim Point with the device providing feedback based on the distance from the sensor to an intersection of said beam with an object or obstacle;
   wherein said device's feedback system provides haptic or acoustic feedback that varies the relationship between the change in distance to the change in the signal characteristics (amplitude, frequency, or pattern) such that the change in the signal characteristics varies with scanning distance, and further providing for the following:
   a greater rate of change in the signal characteristics for object distances within a zone that is recursively scanned or scanned at a slower or faster Aim Point motion rate; and
   a change in the signal characteristics based on user input to said device and/or said SRD control device or said SRD control app.

4. A non-visual precision spatial awareness device of claim 3 comprising a tilt sensor, wherein the tilt sensor is an inclinometer or gyroscope embedded within said HPMS and calibrated to measure the direction of said beam with respect to a stationary coordinate axis that is centered on said user and wherein device angular data from said tilt sensor is used with the HPMS to calculate the horizontal distance from the HPMS to the surface detected at the Aim Point using angular direction provided by said tilt level detector and the linear distance from the HPMS, and a SRD control device using a voice input, touchscreen input, or gesture input; and further comprising the following:
   a Data Communication System (DCS),
   a global positioning system/global navigation system (GPS) receiver/processor,
   an accelerometer,
   a compass, and
   an altimeter;
and further comprising one or more of the following:
   an Optical Imaging and Information System (OIIS),
   a Secondary Wide Angle Detector (SWAD).

5. A non-visual precision spatial awareness device of claim 4, wherein sensor collected precision mapped data are stored in a designated mapping information system along with additional information further comprising one or more of the following:
   a user's current position orientation and movement
   a user's annotations about objects, obstacles/hazards, and/or places.

6. A non-visual precision spatial awareness device of claim 5, further comprising the DCS wherein the DCS communicates additional information between the device and a remote point, comprising one or more of the following:
   a device location and/or status;
   a set of device alerts based on sensor data or device events, device user initiated actions, and/or remotely initiated actions.

7. A non-visual precision spatial awareness device of claim 6, further comprising an alert module that enables at least one of the following:
   a function that allows setting of a series of envelopes or zones at specified or user motion derived dynamic distances around said user, such that when an envelope boundary and a scanned or stored obstacle or object intersect or would intersect if their relative motions are maintained provides the user an alert;
   a function that provides the user an alert, in which said alert is based on a projected zone of intersection between the user and said object based on their relative directions, distance, and movements.

8. A non-visual precision spatial awareness device of claim 7, in which said alert module enables setting alerts to the user of the location, specific presence and direction of hazards, obstacles, or objects not immediately scanned by said HMIS based on calculation of the user's precise location, orientation and motion relative to the previously mapped or scanned data of said hazards, obstacles, or objects locations and movements.

9. A non-visual precision spatial awareness device of claim 4 further comprising at least one of the following features:
- an ability to communicate with an internal or external GIS having stored beacons, or with landmarks or contours of known position within the line of sight for said device within the UPZ;
- a function to calculate or retrieve the precise locations of said beacons or line of sight objects or the contours facing the UPZ based on results of the device GPS, IMUs or beacon sensor; or
- a function to further calculate the user's precise position and orientation within the UPZ by comparing, the measured distances to the known precise locations of the nearby beacons, landmarks or landmark contours stored in the GIS and communicates said position and orientation to the user or device systems.

* * * * *